Patented Dec. 25, 1945

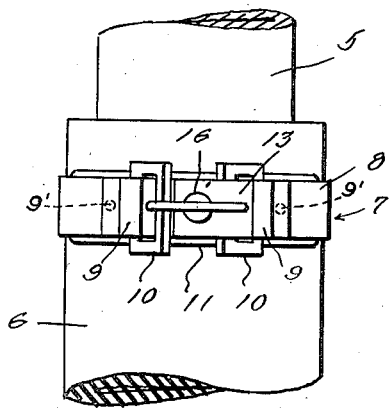
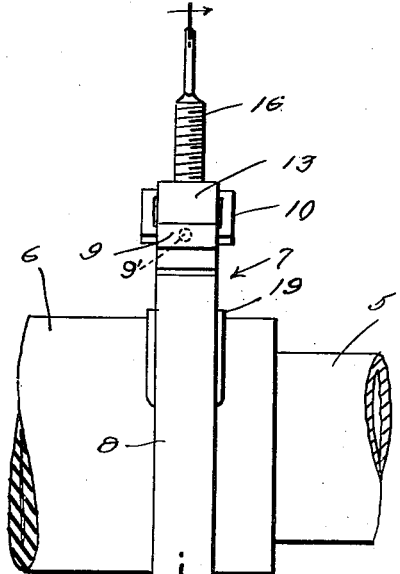
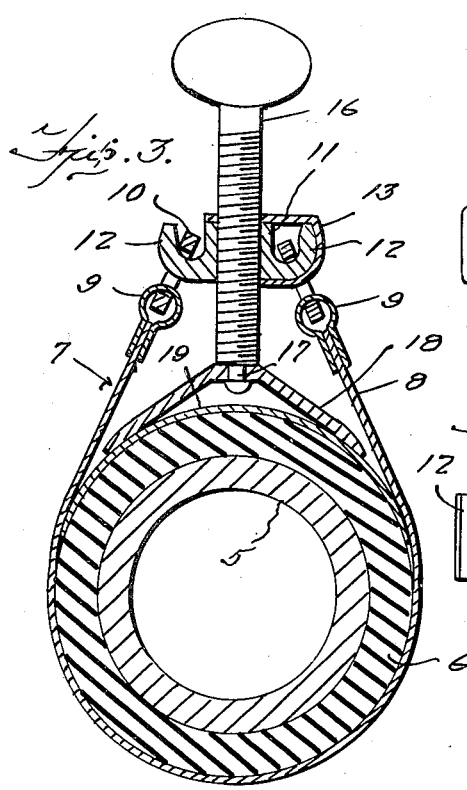
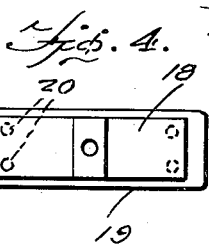
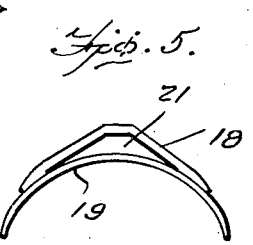
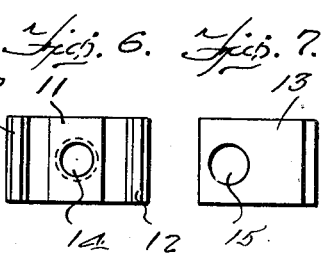

2,391,804

UNITED STATES PATENT OFFICE 2,391,804

HOSE CLAMP

Nathan D. Smith, Aberdeen, Md.

Application June 7, 1944, Serial No. 539,100

3 Claims. (Cl. 24—19.)

This invention relates to a hose clamp for use in connecting a rubber or similar hose to a fitting or nipple, such as required in the fuel line of the motor of an airplane, in the fuel line or in the water line of the cooling system of the motor of a motor vehicle, and the like.

More particularly, the present invention relates to an improved hose clamp of the type having a flexible tension band adapted to encircle the hose, a tightening nut connected to the ends of the band, a bridge, and a screw threaded through the nut and having a thrust engagement with the center of the bridge.

The primary object of the present invention is to provide an improved hose clamp of the above type by means of which a substantially uniform clamping pressure is had entirely about the circumference of the hose, thereby enabling the production of a leak-proof connection between the hose and the nipple without requiring excessive clamping pressure to be exerted by the screw, even in high pressure lines.

Hose clamps of the above types have heretofore been provided with comparatively rigid bridges and direct fixed attachment of the tension band to the tightening nut. This has resulted in application of most of the clamping pressure at opposite points in line with the screw, rather than uniformly entirely about the circumference of the hose. The resulting tendency to flatten the hose in transverse section has therefore made it very difficult and often impossible to provide a leak-proof joint with prior hose clamps, especially when used in connection with high-pressure lines.

Objects of the present invention, therefore, are to provide a hose clamp of the above type wherein the bridge includes an outer rigid member with which the screw has swivelled engagement, and an inner thin flexible member of spring metal which contacts the hose; and to provide pivotal link connections between the ends of the tension band and the nut. The outer rigid member of the bridge is of substantially inverted V-shape and has its ends fixed to the inner flexible member of the bridge at spaced points inwardly of the free ends of said inner flexible member, the intermediate portion of the flexible inner member of the bridge being spaced from and free of connection with the intermediate portion of the rigid bridge member. Thus, the rigid bridge member exerts a circumferential thrust upon the inner flexible bridge member near the ends of the latter so that said flexible bridge member will readily conform to the hose and contact the latter throughout the length of said flexible bridge member to provide a more efficient clamping action. At the same time, the inner flexible bridge member protects the hose from creasing and swelling into the space provided intermediate the ends of the rigid bridge member, and prevents injury to the hose by reason of contact of the swivelled end of the screw therewith. Due to the pivotal link connection of the ends of the tension band with the nut, a pull is exerted on the ends of the band in straight lines at all times without flexing of the band itself. This combination of features brings about a most efficient substantially uniform clamping action entirely about the hose so that leak-proof connections may be readily effected in high-pressure lines without requiring undue or excessive tightening of the screw. The inner flexible member of the bridge is preferably extended beyond the ends of the rigid outer bridge member to points well adjacent the opposite sides of the hose and under the adjacent portions of the tension band so that efficient clamping action is had at the sides of the hose due to cooperative action of the ends of the flexible bridge member and the adjacent portions of the tension band. The action obtained is that the ends of the flexible bridge member are actually thrust between the hose and adjacent portions of the tension band at the sides of the hose, when the screw is tightened.

Another object of the invention is to provide a hose clamp of the above character in which the pivotal link connections between the ends of the tension band and the nut include links hinged to the ends of the band, and hook members on opposite sides of the nut engageable in the links. Means are provided to retain one of the links engaged with one of the hooks of the nut, while the other link is readily disengageable from the other hook when the clamp is loosened, so as to facilitate application or removal of the clamp relative to the hose without requiring its disconnection from the nipple.

Other and more specific objects and features of the invention will become apparent from the following description when considered in connection with the accompanying drawing, and the invention consists in the novel form, combination and arrangement of parts hereinafter more fully described, shown in the drawing and claimed.

In the drawing, wherein like reference characters indicate corresponding parts throughout the several views;

Figure 1 is a fragmentary plan view showing the end of a hose connected to a nipple by means of a hose clamp constructed in accordance with the present invention.

Figure 2 is a side elevational view thereof looking toward the left of Figure 1.

Figure 3 is an enlarged transverse section taken substantially on line 3—3 of Figure 2, but with the screw in elevation.

Figure 4 is a plan view of the bridge member per se, forming part of the hose clamp shown in Figures 1 to 3, inclusive.

Figure 5 is an elevational view of the bridge member shown in Figure 4.

Figure 6 is a top plan view of the nut forming part of the clamp shown in Figure 1, and Figures 7 and 8 are, respectively, top plan and elevational views of the device for maintaining one of the links of the tension band in connected relation with one of the hooks of the nut.

Referring in detail to the drawing, 5 indicates a rigid nipple or fitting on which is slipped one end of a rubber or like hose 6, and 7 generally indicates the present hose clamp which is employed to provide a leak-tight connection between the hose 6 and nipple or fitting 5.

The hose clamp comprises a flexible band 8 made of thin metal of a length to encircle the hose at the clamping area. Loops 9, formed of returned bent strips of thin metal, are permanently secured to the ends of the band 8, preferably by spot welding the ends thereof to the band as at 9', the ends of the band being received between the ends of the loops as shown. Pivotally engaged in the loops 9 are links 10, one for each end of the band and preferably of substantially rectangular form as shown. The hose clamp further includes a nut 11 having laterally projecting outwardly facing hooks 12 integrally formed on opposite sides thereof. The links 10 are pivotally engaged with the respective hooks 12, and one of the links is left readily engageable or disengageable with respect to the associated hook. The other link is maintained in engagement with the other hook by suitable means, such means preferably consisting of a substantially J-shaped device 13 formed of a strip of metal. The straight portion of the device 13 is disposed across the outer face of the nut 11 and bridges the open outer side of the associated hook 12, while the curved portion of the device 13 embraces the outer side of the associated hook and the underside of the nut 11 at the adjacent side of its threaded bore 14. The straight portion of the device 13 has an aperture 15 of a size corresponding to that of the threaded bore 14 of the nut 11 and registered therewith. While there are other possible ways of constructing the nut for connection with the links, the construction shown and described provides for economical and expeditious production and assembly by mere stamping and tooling operations of a simple nature.

The tightening screw 16 is disposed in the plane of the hose axis and threaded through the nut 11 and disposed through the opening 15 of the device 13. At its inner end, the screw 16 has a swivelled connection as at 17 with the outer rigid member 18 of a bridge member that also includes an inner flexible member 19 of thin spring metal. The rigid bridge member 18 is of inverted substantially V-shape, and the inner flexible bridge member 19 is of arcuate form and normally has a radius of curvature slightly less than that of the hose. The ends of the rigid member 18 are secured, preferably by spot welding at 20, to the member 19 adjacent but inwardly of the free ends of the latter, and a space 21 exists between the intermediate portions of the members 18 and 19 so that the swivelled end of the screw 16 is always spaced outwardly of the bridge member 19 and is protected against contact with the hose by said member 19. The bridge member 19 will resiliently grip the hose in applying the clamp so that it will assist in the application of the clamp, said member 19 yieldingly conforming to the contour of the hose throughout its length. As shown clearly in Figure 3, the bridge member 19 is of a length to project considerably beyond the ends of the rigid bridge member 18 and to pass between the hose and the adjacent portions of the band 8 adjacent the sides of the hose. The action had in tightening the screw 16 is that the ends of the bridge member 18 exerts an outward and downward thrust on the bridge member 19 at spaced points considerably beyond opposite sides of the screw and adjacent opposite sides of the hose, thereby forcing the ends of the bridge member 19 to conform to the hose throughout its length and thrusting the ends of the bridge member 19 between the hose and the adjacent portions of the band 8. Also, the ends of the band 8 are drawn outwardly in straight lines without the necessity of flexing the band at the connection of its ends with the nut 11, this automatic alignment being effected due to the pivotal engagement of the links 10 with the hooks 12 of the nut and with the loops 9 on the ends of the band. The result is that a substantially uniform clamping pressure is readily effected entirely about the circumference of the hose by a means which does not require excessive tightening of the screw or the application of a great amount of torque. It is therefore possible to readily effect leak-proof connections between a hose and a nipple or the like without placing the hose clamp or any part thereof under undue strain that might cause damage or breakage of the parts. Another advantage is that by effecting a leak-proof connection by the use of relatively low-clamping pressure, leak-proof connections can be insured with ease and facility even in connection with high-pressure lines. At the same time, the relatively lesser clamping pressure will insure against the band and bridge from embedding themselves deeply into the hose.

The manner of applying the clamp is well understood and need not be discussed, the operation of the invention being fully set forth in connection with the description. It might be noted, however, that all parts of the clamp are connected in assembled relation at all times with the exception that one of the links 10 is releasably engageable with one of the hooks 12. Thus, by turning the screw 16 to feed the nut 11 toward the hose, the clamp may be loosened sufficiently so that the said link may be disengaged from the associated hook to facilitate removal of the clamp. A reversal of this will, of course, permit ready application of the clamp without requiring disconnection of the hose with respect to the nipple or fitting 5. Thus, very quick application or removal of the clamp is had.

From the foregoing description, it is believed that the construction and operation, as well as the advantages of the present invention, will be readily understood and appreciated by those skilled in the art. Minor changes in the details of construction illustrated and described are contemplated, such as fall within the spirit and scope of the invention as claimed.

What I claim:

1. A hose clamp of the type having a flexible tension band adapted to encircle the hose and a tightening nut secured to the ends of the band, a bridge, and a screw threaded through the nut and having a thrust engagement with the center of the bridge, said bridge comprising an outer rigid member of inverted substantially V-shape to which the inner end of the screw is swivelled, and an inner arcuate flexible member having its intermediate portion spaced from the intermediate portion of the outer rigid bridge member, the ends of said outer rigid bridge member being fixed to the inner bridge member at points adjacent but inwardly of its free ends, said tension band having a link pivoted to each end thereof and pivotally engaged with the nut.

2. A hose clamp of the type having a flexible tension band adapted to encircle the hose and a tightening nut secured to the ends of the band, a bridge, and a screw threaded through the nut and having a thrust engagement with the center of the bridge, said bridge comprising an outer rigid member of inverted substantially V-shape to which the inner end of the screw is swivelled, and an inner arcuate flexible member having its intermediate portion spaced from the intermediate portion of the outer rigid bridge member, the ends of said outer rigid bridge member being fixed to the inner bridge member at points adjacent but inwardly of its free ends, said tension band having a link pivoted to each end thereof and pivotally engaged with the nut, said nut having outwardly facing hooks formed on opposite sides thereof engaged in the links, and means securing one of the links in the associated hook, the other link being separable from the other hook upon loosening the screw.

3. A hose clamp of the type having a flexible tension band adapted to encircle the hose and a tightening nut secured to the ends of the band, a bridge, and a screw threaded through the nut and having a thrust engagement with the center of the bridge, said bridge comprising an outer rigid member of inverted substantially V-shape to which the inner end of the screw is swivelled, and an inner arcuate flexible member having its intermediate portion spaced from the intermediate portion of the outer rigid bridge member, the ends of said outer rigid bridge member being fixed to the inner bridge member at points adjacent but inwardly of its free ends, said tension band having a link pivoted to each end thereof and pivotally engaged with the nut, said nut having outwardly facing hooks formed on opposite sides thereof engaged in the links, and means securing one of the links in the associated hook, the other link being separable from the other hook upon loosening the screw, the means for securing the first link in engagement with the first hook including a J-shaped strip of metal having a portion engaging the top of the nut and provided with an opening through which the screw passes and a portion bridging the hook and embracing the outer side of the latter.

NATHAN D. SMITH.